(12) United States Patent
Ueda et al.

(10) Patent No.: US 7,016,186 B2
(45) Date of Patent: Mar. 21, 2006

(54) PORTABLE INFORMATION PROCESSING APPARATUS

(75) Inventors: Dai Ueda, Osaka (JP); Hisashi Taniguchi, Osaka (JP); Hideki Harada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 74 days.

(21) Appl. No.: 10/791,886

(22) Filed: Mar. 4, 2004

(65) Prior Publication Data
US 2004/0207978 A1    Oct. 21, 2004

(30) Foreign Application Priority Data
Mar. 28, 2003 (JP) .............................. 2003-091168

(51) Int. Cl.
*H05K 7/00* (2006.01)
(52) U.S. Cl. ........................ 361/683; 381/388
(58) Field of Classification Search ................ 381/388, 381/333, 306, 386, 309, 87, 88, 89, 90, 303–307, 381/345; 181/148, 150, 199; 361/679–684, 361/724–727; 353/122, 119, 120; 248/917; 345/169, 905; 312/223.1–223.6
See application file for complete search history.

(56) References Cited

U.S. PATENT DOCUMENTS

| | | | | |
|---|---|---|---|---|
| 5,847,922 A | * | 12/1998 | Smith et al. | 361/683 |
| 6,304,434 B1 | * | 10/2001 | Markow | 361/683 |
| 6,304,661 B1 | * | 10/2001 | Azima et al. | 381/152 |
| 6,324,052 B1 | * | 11/2001 | Azima et al. | 361/683 |
| 6,367,324 B1 | * | 4/2002 | Nozawa et al. | 73/290 V |
| 6,498,721 B1 | * | 12/2002 | Kim | 361/681 |
| 6,809,927 B1 | * | 10/2004 | Ohashi et al. | 361/699 |

FOREIGN PATENT DOCUMENTS

JP       2002-359890       12/2002

* cited by examiner

*Primary Examiner*—Lynn Feild
*Assistant Examiner*—Zachary Pape
(74) *Attorney, Agent, or Firm*—Wenderoth, Lind & Ponack, L.L.P.

(57) ABSTRACT

A portable information processing apparatus is capable of saving space, protecting its speakers, and preventing invasion of rain or dust when used outdoors, while maintaining stereo sound output of high quality. The portable information processing apparatus comprises a main body, a display unit incorporating a display panel, a rear casing of the display unit, and a speaker unit contained between the rear casing and display panel. The rear casing is provided with sound release holes.

19 Claims, 3 Drawing Sheets

PORTABLE INFORMATION PROCESSING APPARATUS

FIELD OF THE INVENTION

The present invention relates to a portable information processing apparatus incorporating a speaker unit.

BACKGROUND OF THE INVENTION

Recently, information processing apparatuses such as personal computers have become enhanced in performance and are provided with multi-media functions for processing video and audio data. For this reason, notebook type personal computers and other portable information processing apparatuses have come to be provided with speakers for audio output to reproduce of sound at high quality. An example of such notebook is disclosed in Japanese Laid-open Patent No. 2002-359890.

A conventional portable information processing apparatus with speakers is explained by referring to FIG. 6.

FIG. 6 is a perspective outline view of a prior art notebook type personal computer as a portable information processing apparatus. In FIG. 6, a personal computer 10 comprises a main body 12, a keyboard 14, a display unit 16, a display panel 18, and speaker panels 20. The display panel 18 is a thin type panel using a liquid crystal display or a plasma display. The display unit 16 is foldable and coupled to the main body 12 so as to be opened or closed relative to the main body 12. When the display unit 16 is closed, the top end 16A of the display unit 16 is hooked in close contact with the main body 12. The speaker panels 20 are flat and slidable through compartment openings 22 provided at the display unit sides 16B. While not in use, the speaker panel 20 is contained in the display unit 16. When reproducing sound, the speaker panel 20 is drawn out from the both display unit sides 16B through the compartment openings 22. That is, the speaker units 20 are drawn in and out in the directions of arrows 20A.

In this manner, the conventional notebook or portable information processing apparatus reproduces stereo audio output of high quality and saves space by concealing the speakers when being carried or not in use.

In the conventional portable information processing apparatus, however, since the speaker panels 20 are drawn out to the right and left sides during use, sufficient space is needed when using the speakers. Substantially, therefore, space is not saved. Also, this arrangement requires a process of drawing out the speaker panels 20, and the speaker may be damaged when being drawn out.

When carrying the conventional information processing apparatus and using it outdoors, unexpected rain or dust may invade into the apparatus, and inside parts of the display panel and other parts may be damaged by such foreign matter.

SUMMARY OF THE INVENTION

The portable information processing apparatus comprises:
a main body;
a display unit foldably attached to the main body and incorporating a display panel;
a rear casing of the display unit; and
a speaker unit contained between the rear casing and display panel,
wherein the rear casing has first sound release holes for releasing the sound from the speaker unit.

DETAILED DESCRIPTION OF THE EXEMPLARY EMBODIMENTS

Figure 1:
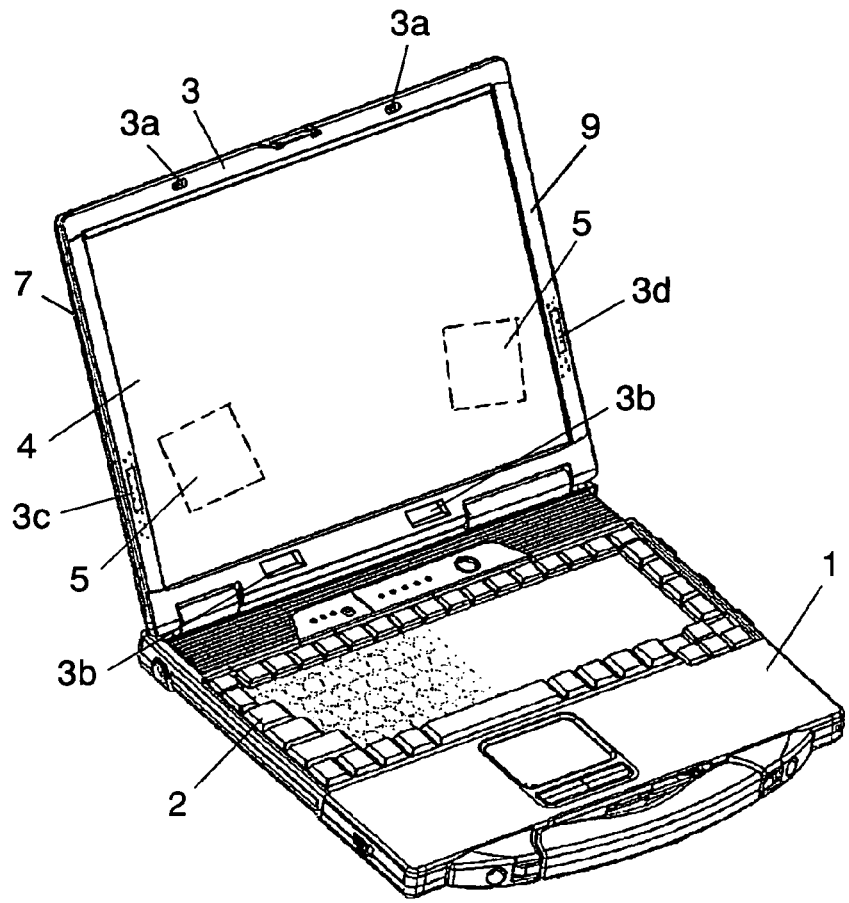
FIG. 1 is a perspective outline view of an open state of a display unit of a notebook type personal computer as a portable information processing apparatus in an exemplary embodiment of the invention.

The invention presents a portable information processing apparatus capable of saving substantial space and protecting speakers of the apparatus while maintaining stereo audio output of high quality. The invention further presents a portable information processing apparatus capable of preventing invasion of rain or dust during outdoor use. The invention moreover presents a portable information processing apparatus capable of maintaining stereo audio output of high quality whether the display unit is open or closed.

An exemplary embodiment of the invention is described below while referring to FIG. 1 to FIG. 5.

Exemplary Embodiment 1

In FIG. 1 to FIG. 5, a main body 1 comprises circuits, memories and a storage unit for executing information processing as a personal computer, and input and output interfaces for communicating with an external appliance. A keyboard 2 has various keys arranged in a specified layout. A display unit 3 contains a display panel 4. The back side of the display unit 3 is covered with a rear casing 7. The display panel 4 is a liquid crystal apparatus or plasma display, and the display unit 3 is thin and flat. A speaker unit 5 contains flat speakers. In this exemplary embodiment, the speaker unit 5 is a flat piezoelectric speaker. The speaker unit 5 is attached to the rear casing 7 of the display unit 3 through a sealing member 6 by way of screws or other tightening parts.

The screws or other tightening parts are not shown. The sealing member 6 is an elastic sheet material. The sealing member 6 is intended to prevent interference with the front side of the speaker unit 5 by the sound released to the back side of the speaker unit 5 and turning around to the front side. The sealing member 6 further prevents invasion of rain or dust escaping a waterproof mesh sheet 8 from sound release holes 7b into the inside of the apparatus completely. It further suppresses transmission of vibration of the speaker unit 5 to the rear casing 7.

The display unit 3 is foldable and connected to the main body 1 so as to be opened and closed relative to the main body 1. The rear casing 7 of the display unit 3 has an uneven surface, and a plurality of the first sound release holes 7b (hereinafter called sound release holes 7b) are provided in right and left raised faces 7a of the uneven. The waterproof mesh sheet 8 is adhered to close the sound release holes 7b. The waterproof mesh sheet 8 is a metal sheet having multiple round pores formed like mesh. The pore diameter is 100 to 500 microns. This pore size of 100 to 500 microns is large enough for releasing sound, but small enough for preventing invasion of rain or dust. Preferably, about 70 pores of about 300 microns are formed in a square inch.

Since the sound release holes 7b are formed in the raised faces 7a of the rear casing 7, the appearance is not spoiled, and when used outdoors, rain or dust hardly invades in the closed state of the display unit of the personal computer.

Further, second sound release holes 3a, 3b, 3c, 3d (hereinafter called sound release holes 3a, 3b, 3c, 3d) are provided at the front end of the display unit 3. The sound release holes 3a are positioned at the upper end of the front side of the display unit 3, and the sound release holes 3b are positioned at the lower end of the front side of the display unit 3. The sound release hole 3c is positioned at the left end of the front side of the display unit 3, and the sound release hole 3d is positioned at the right end of the front side of the display unit 3. The sound release hole 3c, left side sound release hole 3a, and left side sound release hole 3b mainly release the sound produced from the left side speaker unit 5. The sound release hole 3d, right side sound release hole 3a, and right side sound release hole 3b mainly release the sound produced from the right side speaker unit 5.

Since the sound release hole is formed at least in any end of the front side of the display unit 3, sound output of high quality can be obtained even if the speaker unit 5 is contained in the display unit casing. Further, stereo sound can be released at high fidelity.

Figure 3:
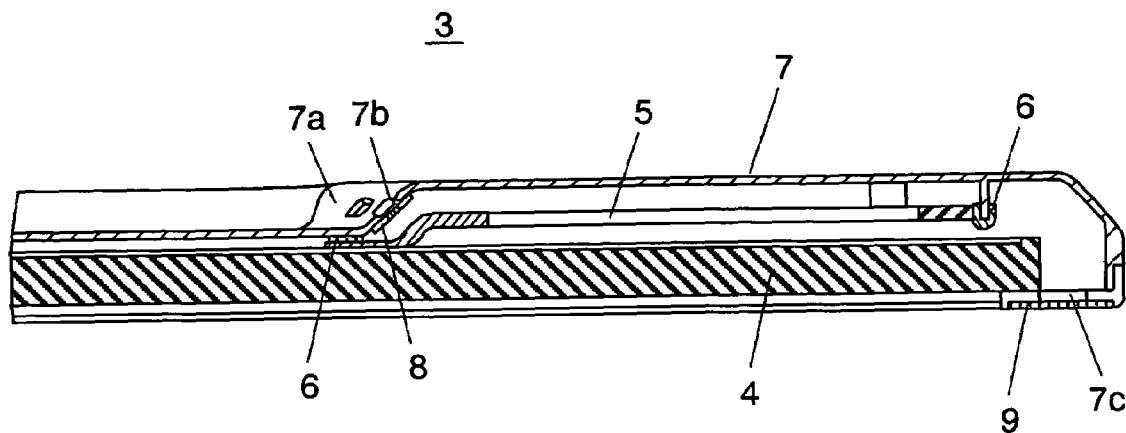
FIG. 3 is a sectional view of a speaker compartment of the notebook type personal computer as the portable information processing apparatus in the exemplary embodiment of the invention.

Moreover, as shown in FIG. 3, sound release gaps 7c are formed around the display panel 4 and around the rear casing 7, and are present at both right and left sides. Sound is also released efficiently from these sound release gaps 7c. The left side sound release gaps 7c mainly release the sound produced from the left side speaker unit 5, and the right side sound release gaps 7c mainly release the sound produced from the right side speaker unit 5.

Figure 4:
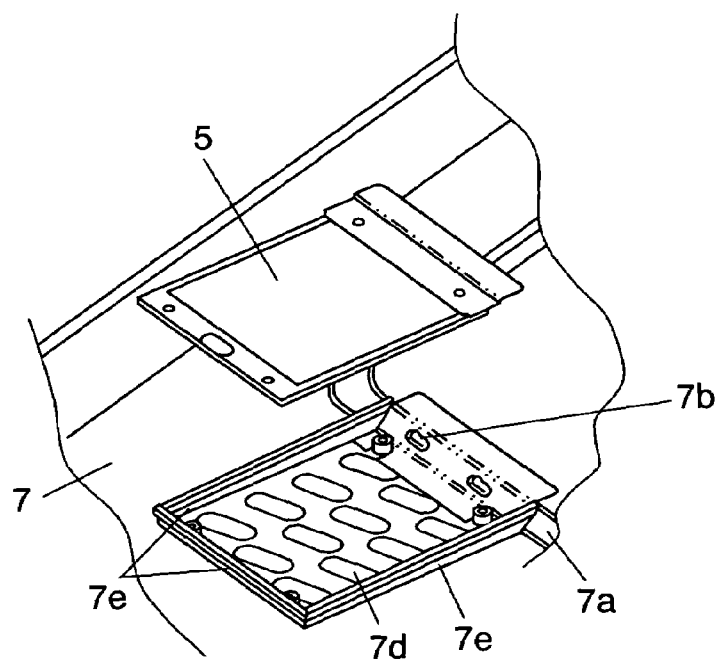
FIG. 4 is a perspective exploded view of the speaker compartment of the notebook type personal computer as the portable information processing apparatus in the exemplary embodiment of the invention.

A contained example of the speaker unit 5 is further described by referring to FIG. 4. In FIG. 4, a wall 7e is provided in the rear casing 7. By this wall 7e, and raised faces 7a and rear casing 7, a box opened at the side facing the display panel 4 is formed. At the position of this open side of the box, the speaker unit 5 is accommodated. That is, the box formed by the wall 7e, raised faces 7a and rear casing 7 functions as a so-called speaker box. With this speaker box, sound of higher quality can be reproduced. The shape and volume of the box formed by the wall 7e, raised faces 7a and rear casing 7 may vary the register and quality of sound reproduction. Therefore, the shape and volume of the box may be determined so as to obtain desired register and quality of sound. Or when using a plurality of speakers differing in register, boxes suitable to each register may be formed individually.

The speaker unit 5 is installed in the raised faces 7a of the rear casing 7 by screws or other tightening parts. In FIG. 4, such screws or tightening parts are not shown. Also the sealing member 6 is not shown in FIG. 4.

Figure 5:
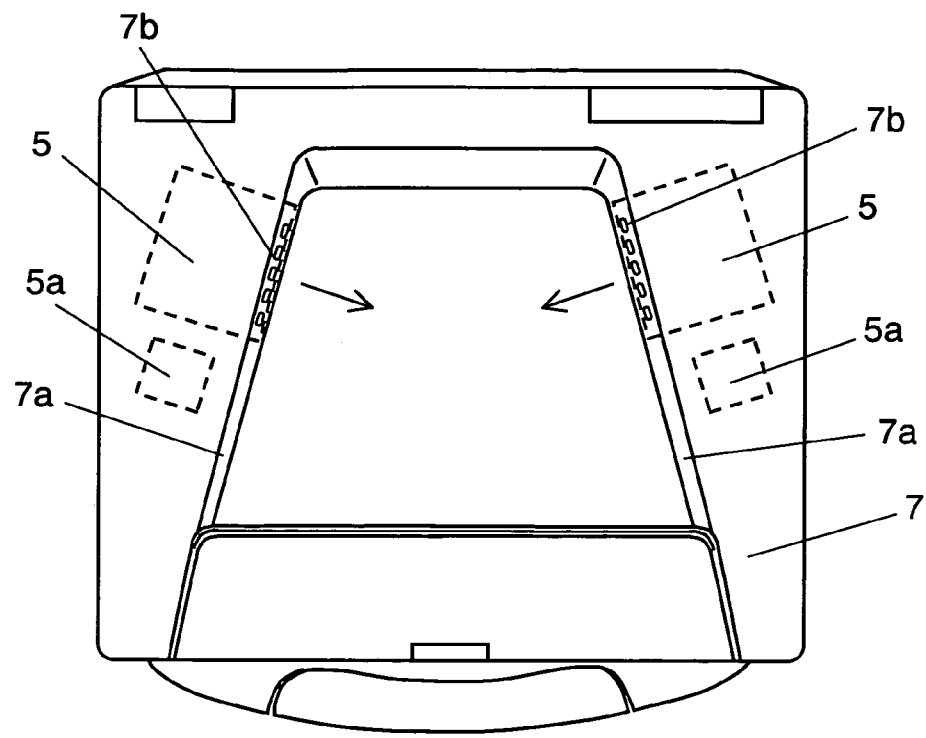
FIG. 5 is an outline view of the closed state of the display unit of the notebook type personal computer as the portable information processing apparatus in the exemplary embodiment of the invention.
Figure 6:
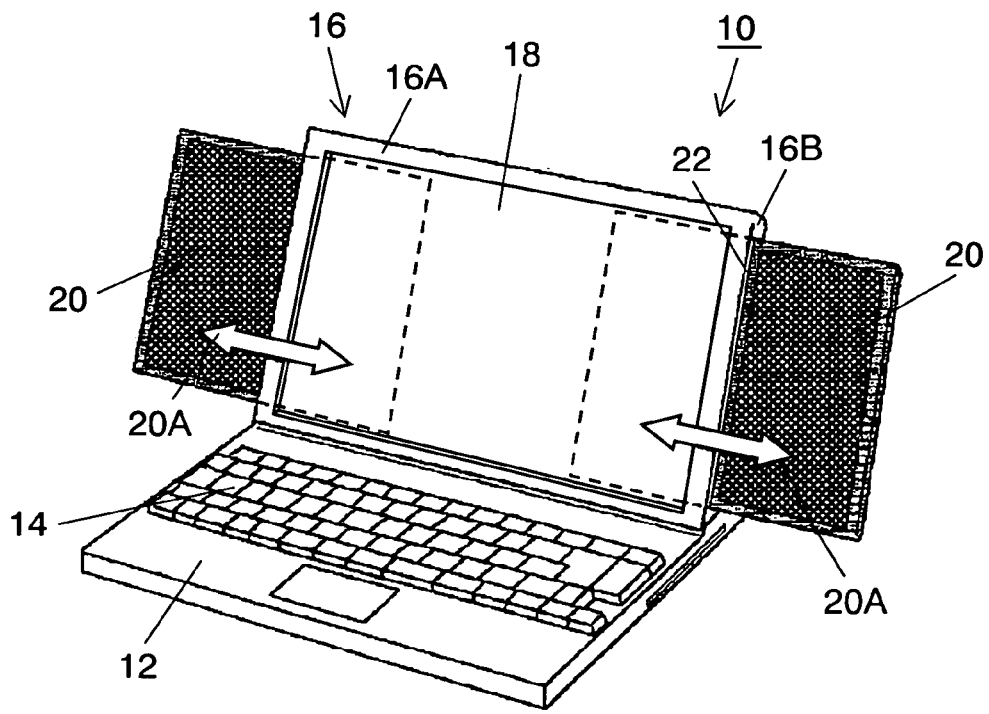
FIG. 6 is a perspective outline view of a prior art notebook type personal computer as a portable information processing apparatus.

An audio amplifier for driving the speaker unit 5 is explained with reference to FIG. 5. In FIG. 5, an audio amplifier 5a receives an audio signal from a circuit contained in the main body 1. The audio amplifier 5a amplifies the received audio signal, and drives the speaker unit 5. As a result, sound is delivered from the speaker unit 5. Since the audio amplifier 5a amplifies the audio signal and drives the speaker unit 5, the audio amplifier 5a generates heat. The audio amplifier 5a is attached to the rear casing 7 in a state of smooth heat transmission to the rear casing 7. The rear casing 7 is made of magnesium alloy, and is very high in heat conductivity. Therefore, the rear casing 7 is equivalent to a heat releasing element of high efficiency for the audio amplifier 5a, and the audio amplifier 5a is efficiently cooled.

Figure 2:
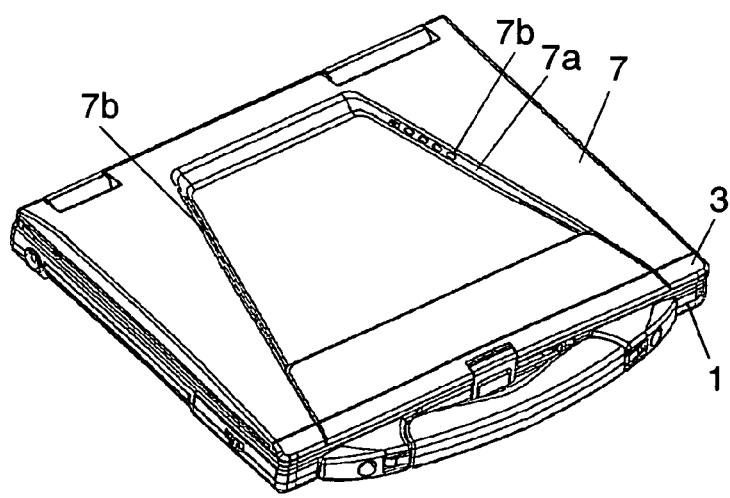
FIG. 2 is a perspective outline view of a closed state of the display unit of the notebook type personal computer as the portable information processing apparatus in the exemplary embodiment of the invention.

As known from FIG. 2 or FIG. 5, the right and left raised faces 7a are not parallel to each other, but are inclined to each other. If the right and left raised faces 7a were parallel to each other, there would be a problem of interference of sound released through the sound release holes 7b provided in the right and left raised faces 7a. That is, a stationary sound field directivity depending on the frequency of sound would be generated. However, in FIG. 2 or FIG. 5, the speaker units 5 are disposed along the right and left raised faces 7a in mutually inclined relation, and the plurality of sound release holes 7b are formed respectively in the right and left raised faces 7a in mutually inclined relation. Thus, the distance between the right and left raised faces 7a is not constant. Therefore, stationary sound field directivity depending on the frequency of sound can be suppressed. That is, the same effect as suppression of sound interference is obtained. Since the sound interference can be suppressed, the attenuation of sound volume can be decreased. As a result, the sound volume can be increased.

The inside surface of the rear casing 7 is explained by referring to FIG. 4. In FIG. 4, dimples 7d are formed in the inside surface of the rear casing 7. Because of the dimples 7d, the inside surface of the rear casing 7 is not smooth but is rough and undulated. The sound produced from the speaker unit 5 is reflected by the inside surface of the rear casing 7. Owing to such undulations, the sound reflected by the inside surface of the rear casing 7 generates components mutually shifted in phase. As a result, the interference of sound released through the sound release holes 7b provided in the right and left raised faces 7a is further suppressed. That is, the sound interference can be further suppressed, and the attenuation of sound volume can be much decreased. Therefore, the sound volume can be further increased.

Further, as shown in FIG. 1 and FIG. 3, a mesh sheet 9 is also provided in the gap between the periphery of the display panel 4 and the periphery of the rear casing 7. The pore size of this sheet 9 is about 500 to 1000 microns, and this diameter is small enough to prevent invasion of foreign matter.

As described herein, in the portable information processing apparatus of the invention, the speaker unit is contained between the rear casing of the display unit and the display panel, and sound release holes of the speaker unit are formed in the rear casing. The rear casing has an uneven surface, and the sound release holes of the speaker unit can be formed in the raised faces of the uneven surface. Sound release holes may also be provided in the front edge of the display unit 3, and sound release gaps may be provided between the periphery of the display panel and the periphery of the rear casing. A mesh sheet is provided on the sound release holes. In such structure, the portable information processing apparatus of the invention can save substantial space and protect the speakers while maintaining the stereo sound output of high quality. Further, invasion of rain or dust can be prevented when used outdoors. Moreover, in the portable information processing apparatus of the invention, by setting the raised faces in a mutually inclined state or forming dimples on the surface of the rear casing, the sound interference can be suppressed, and excellent register and quality of sound can be realized. Also, in the portable information processing apparatus of the invention, the so-called speaker box is formed by the rear casing, raised faces and the wall provided in the rear casing, and by installing the speaker in the speaker box, excellent register and quality of sound can be realized.

What is claimed is:

1. A portable information processing apparatus comprising:
   a main body;
   a display unit foldably attached to said main body and incorporating a display panel;
   wherein said display unit has a rear casing;
   wherein a speaker unit is contained between said rear casing and said display panel;
   wherein said rear casing has an uneven surface with first and second raised faces;
   wherein first sound release holes are provided in each of said first and second raised faces of said uneven surface of said rear casing for releasing sound from said speaker unit;
   wherein the rear casing further has a wall;
   wherein a speaker box is formed of the rear casing, the first and second raised faces and the wall; and
   wherein the speaker unit is provided in the speaker box.

2. The portable information processing apparatus of claim 1, wherein the speaker unit is fixed in the raised face.

3. The portable information processing apparatus of claim 1, wherein the rear casing is formed of magnesium alloy.

4. The portable information processing apparatus of claim 1, wherein a dimple is formed in the inside surface of the rear casing.

5. The portable information processing apparatus of claim 1, further comprising an audio amplifier for driving the speaker unit,
   wherein the audio amplifier is fixed to the rear casing so that the heat is released through the rear casing.

6. The portable information processing apparatus of claim 1, wherein the speaker unit is a flat piezoelectric speaker.

7. The portable information processing apparatus of claim 1, wherein said first and second raised faces are in mutually facing relation so that said first sound release holes in said first raised face are in mutually facing relation with said first sound release holes in said second raised face.

8. The portable information processing apparatus of claim 1, wherein said rear casing is constructed such that said first and second raised faces are non-movably fixed in position relative to each other and relative to said display panel.

9. The portable information processing apparatus of claim 1, further comprising a waterproof mesh sheet provided to cover the first sound release holes.

10. The portable information processing apparatus of claim 9, wherein the pore size of the waterproof mesh sheet is 100 to 500 microns.

11. The portable information processing apparatus of claim 1, wherein the first and second raised faces are provided at right and left symmetrical positions of the rear casing.

12. The portable information processing apparatus of claim 11, wherein the first and second raised faces are in a mutually inclined relation such that a lateral distance between said first and second raised faces varies along a vertical direction of said rear casing when said display unit is unfolded in an open position relative to said main body.

13. The portable information processing apparatus of claim 1, wherein the speaker unit is provided in the rear casing by way of a sealing member.

14. The portable information processing apparatus of claim 1, further comprising sound release gaps positioned between a periphery of the display panel and a periphery of the rear casing,
   wherein the sound release gaps are used for releasing sound.

15. The portable information processing apparatus of claim 14, further comprising a mesh sheet provided to cover the sound release gaps.

16. The portable information processing apparatus of claim 15, wherein the waterproof mesh sheet has pores, the pore size of the waterproof mesh sheet is 100 to 500 microns.

17. The portable information processing apparatus of claim 1, wherein second sound release holes are provided at side ends of a front side of said display unit.

18. The portable information processing apparatus of claim 17, wherein the second sound release holes are provided in parts positioned at right and left sides of the front side of the display unit.

19. The portable information processing apparatus of claim 17, wherein the second sound release holes are provided in parts positioned at upper and lower sides of the front side of the display unit.

* * * * *